United States Patent
Ondracek (12)

(10) Patent No.: US 11,050,911 B1
(45) Date of Patent: Jun. 29, 2021

(54) ADJUSTABLE MIRROR ASSEMBLY FOR A HANDHELD IMAGE RECORDING DEVICE AND METHODS OF USE THEREOF

(71) Applicant: John Ondracek, Denver, CO (US)

(72) Inventor: John Ondracek, Denver, CO (US)

(*) Notice: Subject to any disclaimer, the term of this patent is extended or adjusted under 35 U.S.C. 154(b) by 0 days.

(21) Appl. No.: 17/095,217

(22) Filed: Nov. 11, 2020

(51) Int. Cl.
| | |
|---|---|
| *H04N 5/225* | (2006.01) |
| *H04B 1/3888* | (2015.01) |
| *H04M 1/02* | (2006.01) |
| *G06F 1/16* | (2006.01) |
| *H04M 1/725* | (2021.01) |

(52) U.S. Cl.
CPC ......... *H04N 5/2254* (2013.01); *G06F 1/1681* (2013.01); *H04B 1/3888* (2013.01); *H04M 1/725* (2013.01)

(58) Field of Classification Search
CPC ...... H04B 1/38; H04B 1/3827; H04B 1/3888; H04N 5/2252; H04N 5/2253; H04N 5/2254; H04N 5/2257; H04M 1/026; H04M 1/0264; H04M 1/04; H04M 1/72; H04M 1/725; G06F 1/1626; G06F 1/1633; G06F 1/1681
See application file for complete search history.

(56) References Cited

U.S. PATENT DOCUMENTS

| | | | | |
|---|---|---|---|---|
| 8,743,538 | B2 * | 6/2014 | Ashcraft | G06F 1/1632 |
| | | | | 361/679.55 |
| 9,730,506 | B2 * | 8/2017 | Lamberger | A45D 42/10 |
| 9,867,127 | B2 * | 1/2018 | Charugundla | H04B 1/3888 |
| 10,842,238 | B2 * | 11/2020 | Gandhi | A45C 11/00 |
| 2011/0294542 | A1 * | 12/2011 | Ray | H04B 1/3888 |
| | | | | 455/575.8 |
| 2019/0069661 | A1 * | 3/2019 | Worley | H04B 1/3888 |

FOREIGN PATENT DOCUMENTS

CN  2745328 Y * 12/2005

\* cited by examiner

*Primary Examiner* — Quochien B Vuong
(74) *Attorney, Agent, or Firm* — Leyendecker & Lemire, LLC; Heather N. Tilley

(57) ABSTRACT

An adjustable mirror assembly for a handheld image recording device and the methods of use thereof is described. Typically, the adjustable mirror assembly comprises a case for receiving and retaining a handheld image recording device therein and a cover having a mirror, wherein the cover is movably coupled with the case by way of a hinge assembly. In other variations, the cover is movably coupled with the handheld image recording device by way of a hinge assembly coupled directly with or to the handheld image recording device.

19 Claims, 14 Drawing Sheets

ADJUSTABLE MIRROR ASSEMBLY FOR A HANDHELD IMAGE RECORDING DEVICE AND METHODS OF USE THEREOF

BACKGROUND

The vast majority of today's American adults own a cell phone of some kind, with most cell phones having image recording capabilities. The exploding popularity in handheld image recording devices, particularly smartphones, have changed the way Americans live their lives. One particularly notable change is the drastic increase in the number of photographs and video recordings that are taken daily, despite declining sales in traditional cameras. The increase in the daily number of captured photographs and video recordings is primarily attributable to mere accessibility. While people may not be carrying a digital camera on their person at all times, most smartphone users are never more than an arm's reach away from their cell phone as its compact size and slim profile allows users to easily carry it in one's pocket or handbag. The convenience of the handheld cell phone camera has led to cell phone users reaching more and more for their cell phone to capture images or video recordings, a trend that has led to the camera being one of the most marketed feature of today's cell phones.

Thanks to advances in cell phone camera technology, today's smartphone users can easily take quality, high resolution images and high definition video recordings at a moment's notice. However, at times it may be difficult for a user to determine the cell phone camera's field of view, or the area in which a camera can see, and adjust the camera's aim accordingly. Unlike traditional cameras, where a user would look through the camera's eyepiece to adjust the camera's field of view, a cell phone camera displays its field of view on the cell phone's display screen. This means that the ability of the user to see the camera's field of view and determine if the camera's aim needs to adjusted is dependent upon the cell phone user's ability to see the image being displayed on the cell phone's display screen.

The recent inclusion of a front-facing camera enabled a cell phone user to see the cell phone camera's field of view on the cell phone's display screen when aiming the front-facing camera at oneself, allowing the user to determine if the camera's aim needed to be adjusted when taking a self-photograph. However, difficulty remains when taking photographs or video recordings that require a user to extend the camera's field of view, such as by holding the cell phone overhead. While holding the cell phone overhead can expand the camera's field of view, the user is no longer able to see the cell phone's display screen when holding the cell phone in this position. If the user is unable to see the cell phone or handheld recording device's display screen, the user cannot see the camera's field of view and is therefore unable to determine the desired image is being captured or if the camera's aim needs to be adjusted. For these and other reasons, a need exists for the present invention.

DETAILED DESCRIPTION

Figure 1:
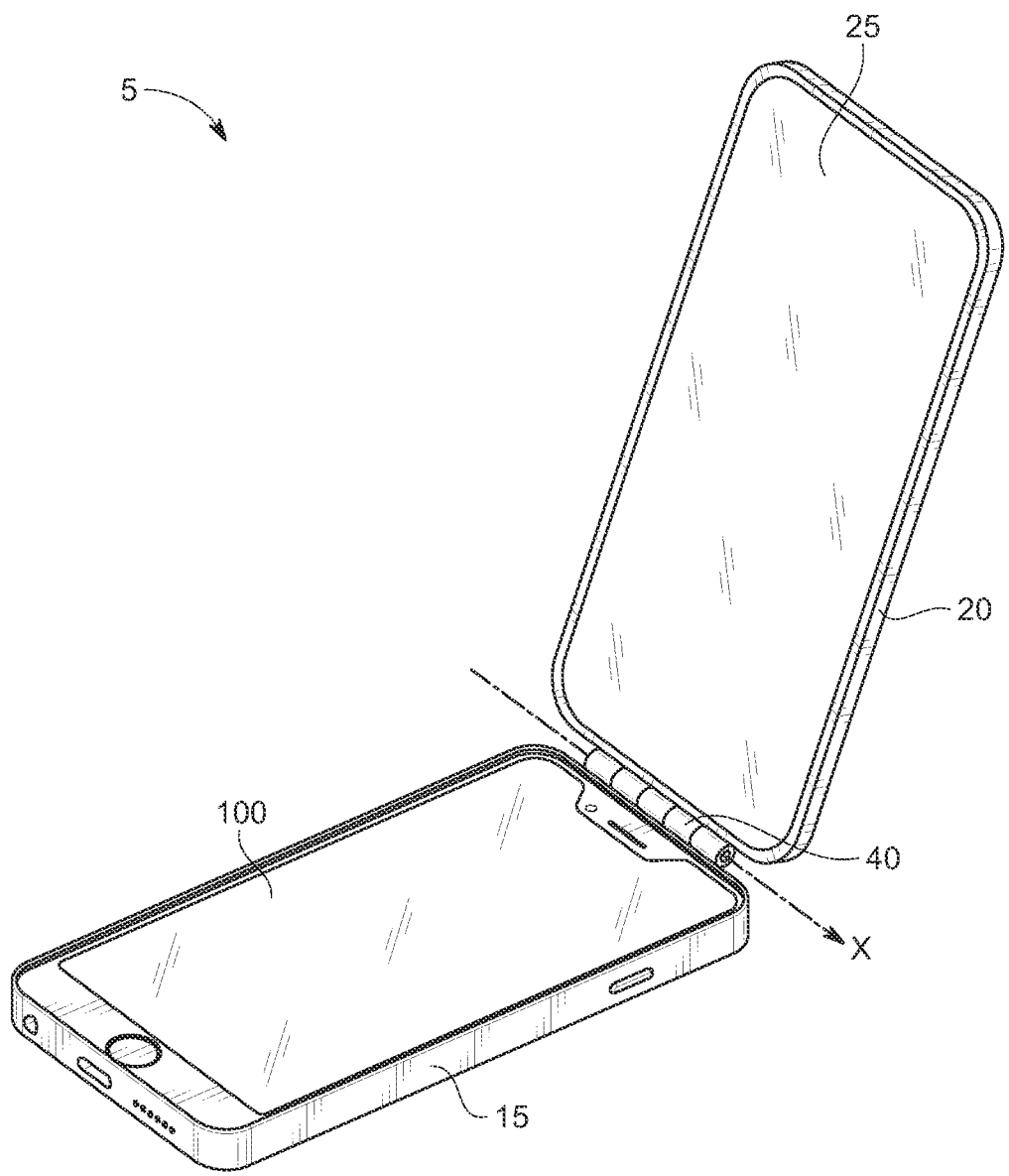
FIG. 1 is a perspective view of a first embodiment adjustable mirror assembly for a handheld image recording device.
Figure 1A:
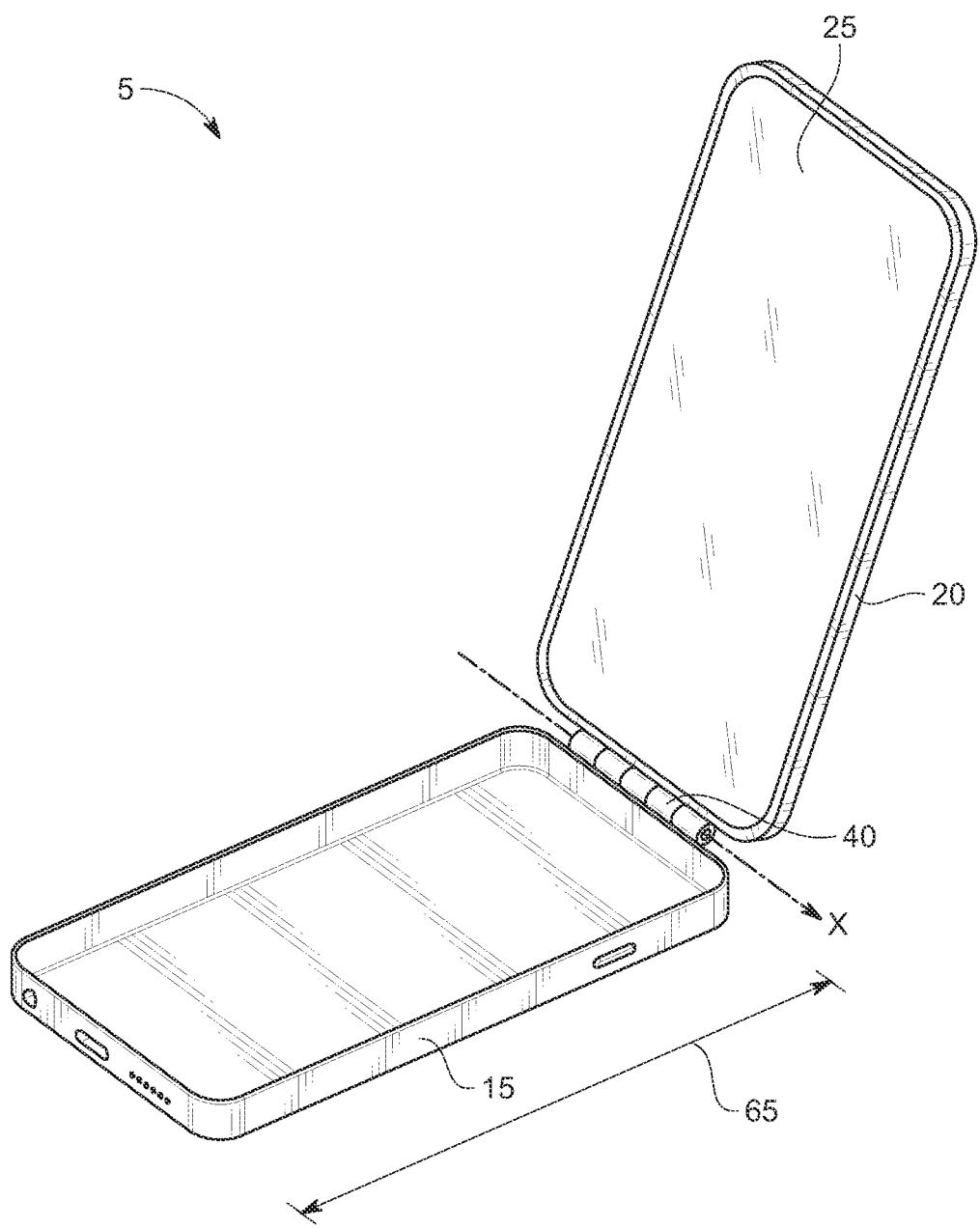
FIG. 1A is a perspective view of a first embodiment adjustable mirror assembly for a handheld image recording device.

Generally, embodiments of the present invention include an adjustable mirror assembly for use with a cellphone. The adjustable mirror assembly generally includes an adjustable mirror assembly comprising a cover having a mirror and a hinge assembly, wherein the cover is movably coupled with the handheld image recording device and is configured to rotate about the x-axis of the hinge assembly. In the embodiments described below, the adjustable mirror assembly is shown in operation with a smartphone as one of the possible handheld image recording devices that may be used with the invention, and there is no intention to limit the invention or exclude any other uses or embodiments of the invention.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "about," as used in this specification and appended claims, refers to plus or minus 20% of the value given.

The term "approximately," as used in this specification and appended claims, refers to plus or minus 10% of the value given.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "generally" and "substantially," as used in this specification and appended claims, mean mostly, or for the most part.

The term "handheld image recording device," as used in this specification and appended claims, may be a camera, a smartphone, cellular phone, camcorder, iPad, iTouch, tablet PC, or other image recording device.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A First Embodiment Adjustable Mirror Assembly for a Handheld Image Recording Device Referring to FIGS. 1-4, a first embodiment adjustable mirror assembly 5 for a handheld image recording device 100 is illustrated. Typically, the adjustable mirror assembly 5 comprises a case 15 and a cover 20 having a mirror 25, wherein the cover 20 is movably coupled with case 15 at hinge assembly 40.

Figure 2:
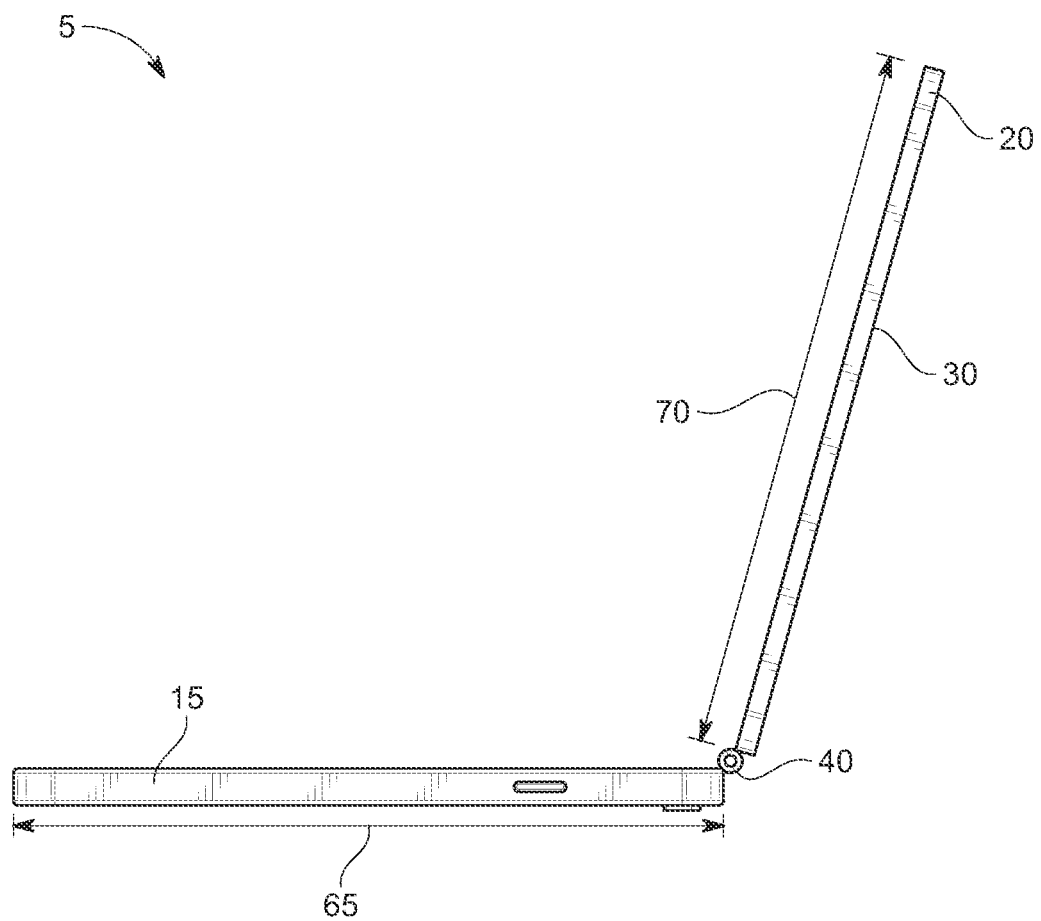
FIG. 2 is a side view of a first embodiment adjustable mirror assembly for a handheld image recording device.
Figure 3:
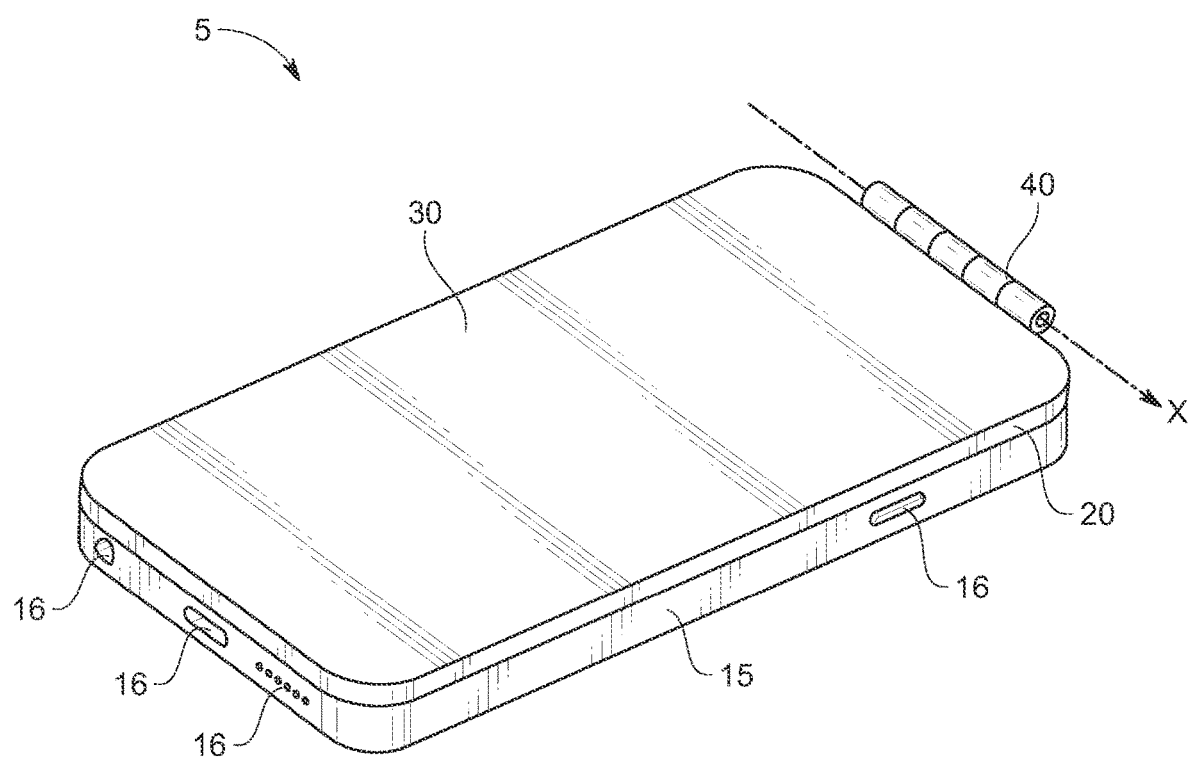
FIG. 3 is a perspective view of a first embodiment adjustable mirror assembly for a handheld image recording device.
Figure 4:
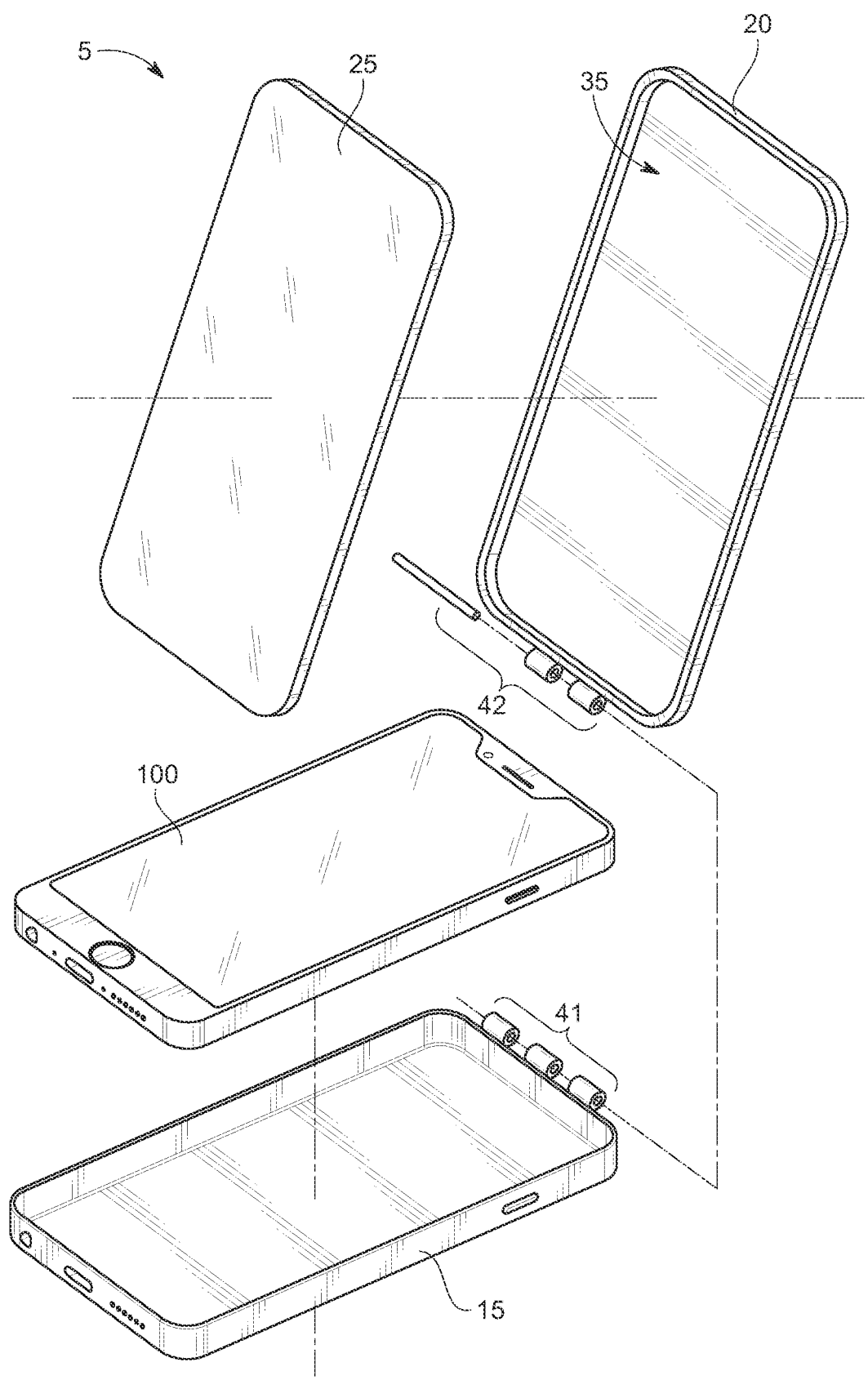
FIG. 4 is an exploded view of a first embodiment adjustable mirror assembly for a handheld image recording device.

Referring to FIG. 4, a case 15 is illustrated. Case 15 is sized and shaped to removably receive and secure a handheld image recording device 100 therein, and comprises apertures 16 sufficient to reveal the functional ports of a handheld image recording device 100 such as the volume control button or buttons, ring/silent switch, headset jack, and USB/power port. As can be appreciated, handheld image recording devices 100 can vary in their precise shape and size depending on the handheld image recording device 100 manufacturer or model. Furthermore, the location of certain features such as the handheld image recording device's 100 camera, ring/silent switch, volume button or buttons, headset jack, charging port, etc. can also vary depending on the handheld image recording device 100 manufacturer or model. Accordingly, it is contemplated that case 15 and apertures 16 can vary in their shape, size, arrangement and configuration as may be necessarily for their compatibility with different handheld image recording device 100 manufacturers and models. Typically, case 15 comprises a durable material such as a thermoplastic polyurethane, polycarbonate, or any other material commonly known in the art Referring to FIG. 4, an adjustable mirror assembly 5 is shown, wherein the cover 20 includes an outward facing portion 30 and an inward facing portion 35. As illustrated in FIG. 3, cover 20 is typically substantially flat, and is shaped and sized to cover all or substantially all of the planar surface of the front display screen side of a handheld image recording device 100 when cover 20 is in the closed stored position. Typically, cover 20 is movably coupled with case 15 at hinge assembly 40, with cover 20 being configured to move between a closed stored position and a plurality of open deployed positions. Referring to FIG. 3, a cover 20 in a closed stored position is shown, wherein the inward facing portion 35 adjoins the front display screen side of the handheld image recording device 100 when cover 20 is in the closed stored position. Referring to FIG. 2, a cover 20 in an open deployed position is shown.

As shown in FIGS. 2 and 3, the cover 20 is typically configured to rotatably move about the x-axis of hinge assembly 40. Typically, cover 20 comprises a durable material such as plastic or any similar polymer, steel, stainless steel or other steel, aluminum, anodized aluminum, glass, carbon fiber, or any other material commonly known in the art. When cover 20 is in a stored closed position, the outward facing portion 30 provides a protective barrier and can aid in preventing undesirable surface scratches to mirror 25 as well as to the handheld image recording device's 100 display screen.

A mirror 25 is typically included on the inward facing portion 35 of cover 20. As shown in FIG. 4, cover 20 may be structured such that its outer edge forms a cavity, wherein the cavity comprises inward facing portion 35. In this variation, mirror 25 is received and retained within the cavity comprising inward facing portion 35. Typically, mirror 25 is substantially rectangular in shape and sized to have substantially the same dimensions as the handheld image recording device 100 display screen. Mirror 25 typically comprises a flat plate of transparent glass coated with a thin reflective metal layer. In some variations, mirror 25 may comprise a polycarbonate mirror. In other variations, mirror 25 may further include a treated, hardened scratch resistant coating.

Figure 5:
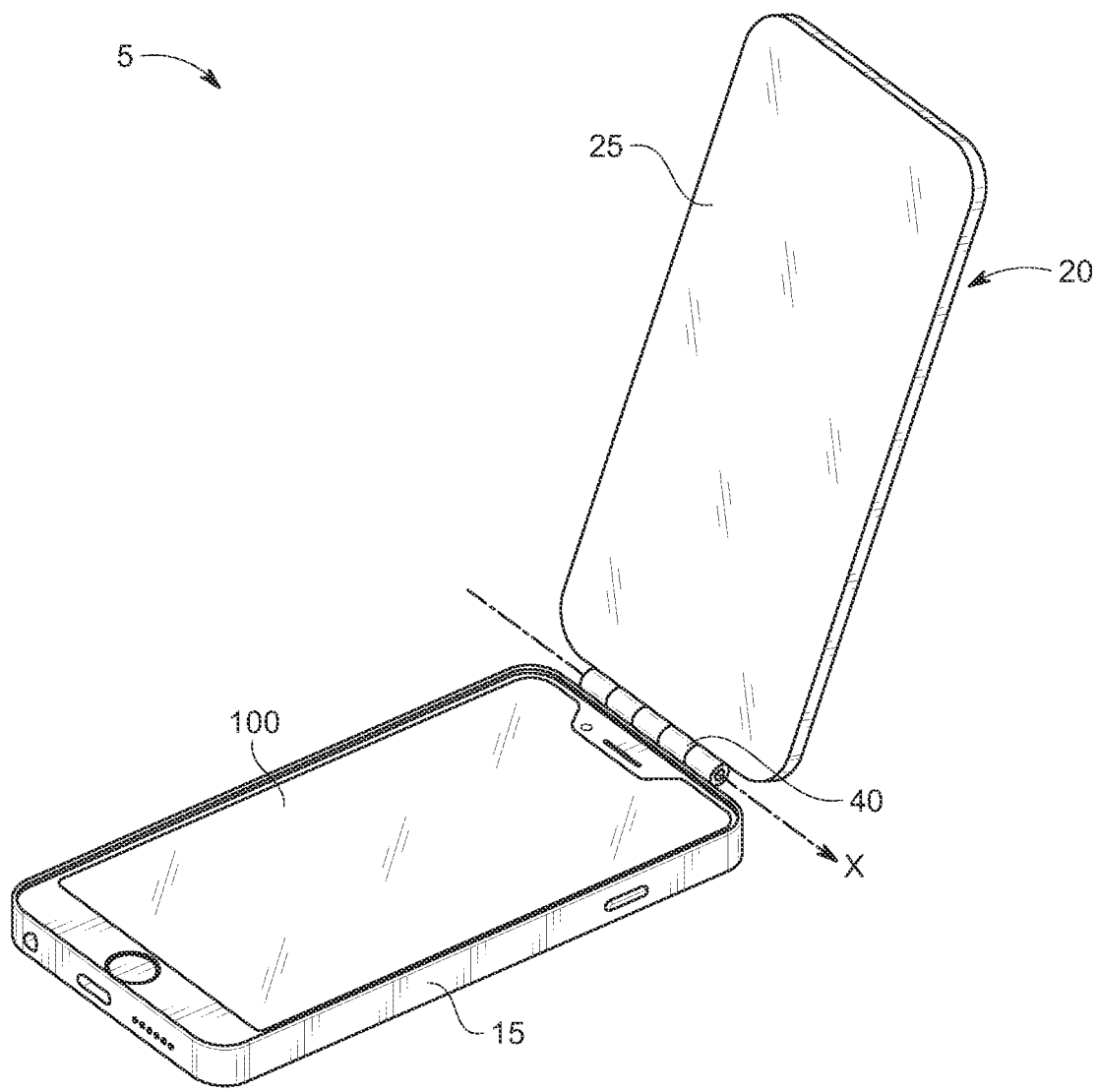
FIG. 5 is a perspective view of a first embodiment adjustable mirror assembly for a handheld image recording device.

In another variation illustrated in FIG. 5, cover 20 comprises a two-way mirror or smart mirror, wherein the outward facing portion 30 is transparent, and the inward facing portion 35 includes a reflective coating comprising mirror 25. In these variations, the user remains able to view the handheld image recording device 100 display screen through the transparent outward facing portion 30 of cover 20 when in the closed stored position.

As illustrated in FIGS. 1-3, the cover 20 is movably coupled with case 15 at hinge assembly 40. Hinge assembly 40 typically comprises a friction hinge system, and enables the cover 20 to be supported at any angular position relative to the handheld image recording device's 100 screen. The friction hinge system typically includes a first hinged portion 41 and a second hinged portion 42, each configured for controlled rotation relative to the other. The cover 20 is hinged relative to the case 15 by coupling the first hinged portion 45 to case 15, and the second hinged portion 50 to cover 20. In other variations, the hinge may comprise a swivel hinge or ball-socket hinge. In these variations, the cover 20 can be swiveled or tilted about hinge assembly 40 in multiple directions relative to case 15.

Figure 12:
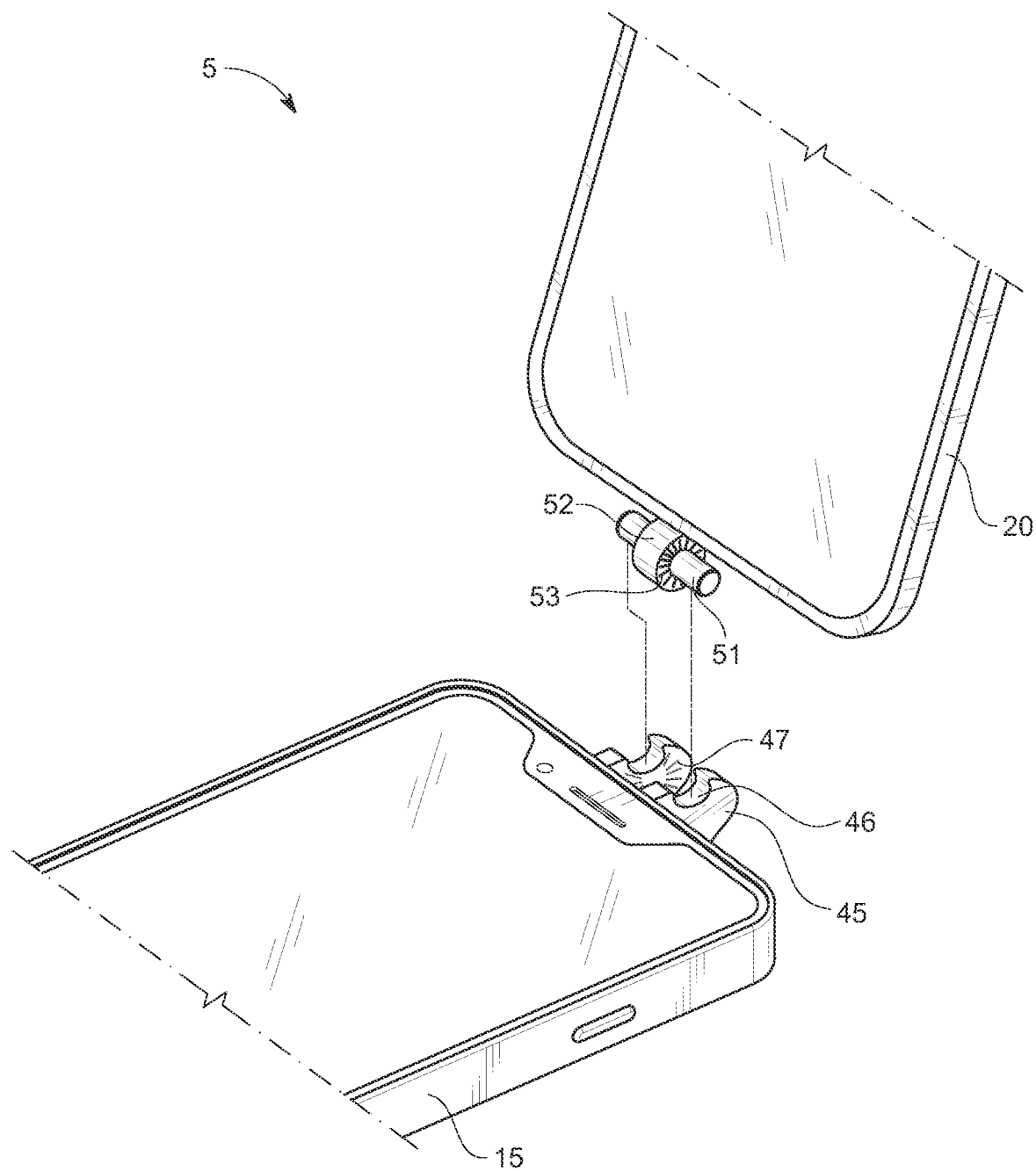
FIG. 12 is an exploded view of a first embodiment adjustable mirror assembly for a handheld image recording device.

As illustrated in FIG. 12, in other variations hinge assembly 40 may comprise a separable hinge system, such as a take-apart hinge, snap hinge, or lift off hinge. In these variations, cover 20 can be quickly uncoupled from and/or recoupled with case 15. This allows a user to move cover 20 to a different position, exchange cover 20 with another cover 20, or store cover 20 when not in use. In the variation illustrated in FIG. 12, hinge assembly 40 is a separable hinge system having first hinged portion 41 comprising an anchor 45, and a second hinged portion 42 comprising a cylindrical pin insert 50. In other variations, the first hinged portion 41 may comprise cylindrical pin insert 50 and the second hinged portion 42 may comprise anchor 45.

As shown in FIG. 12, the first hinged portion 41 comprises an anchor 45 having one or more c-shaped hooks 46 for receiving and retaining a dowel 51 therein. The c-shaped hook 46 typically has a plurality of inwardly depressed grooves 47 radially disposed on c-shaped hook's 46 planar surface. In the variation illustrated in FIG. 12, the second hinged portion 42 comprises a cylindrical pin insert 50 having dowel 51 including a grooved collar 52 at or near the mid-section of dowel 51. Grooved collar 52 has a plurality of outwardly extending grooves 53 radially disposed on the planar surface of grooved collar 52. The diameter of dowel 51 is sized to be received and retained within c-shaped hook 46. The diameter of grooved collar 52 is typically sized to be substantially the same as the outside diameter of anchor 45, as shown in FIG. 10A.

Figure 10:
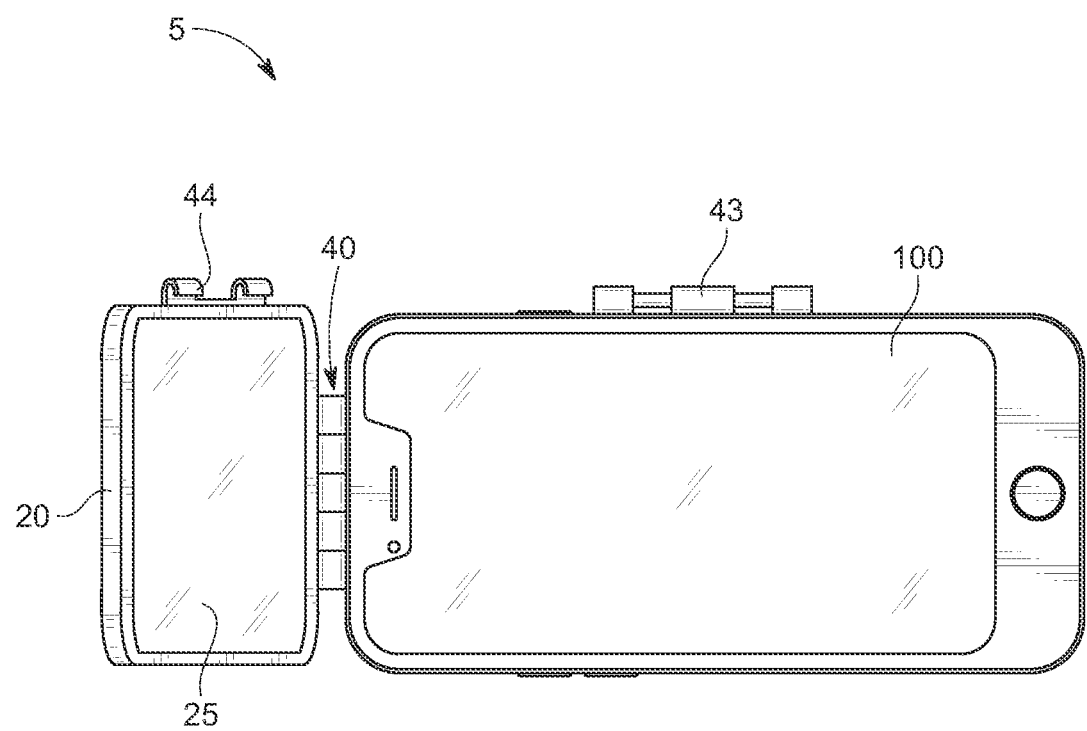
FIG. 10 is a top view of a first embodiment adjustable mirror assembly for a handheld image recording device.
Figure 10A:
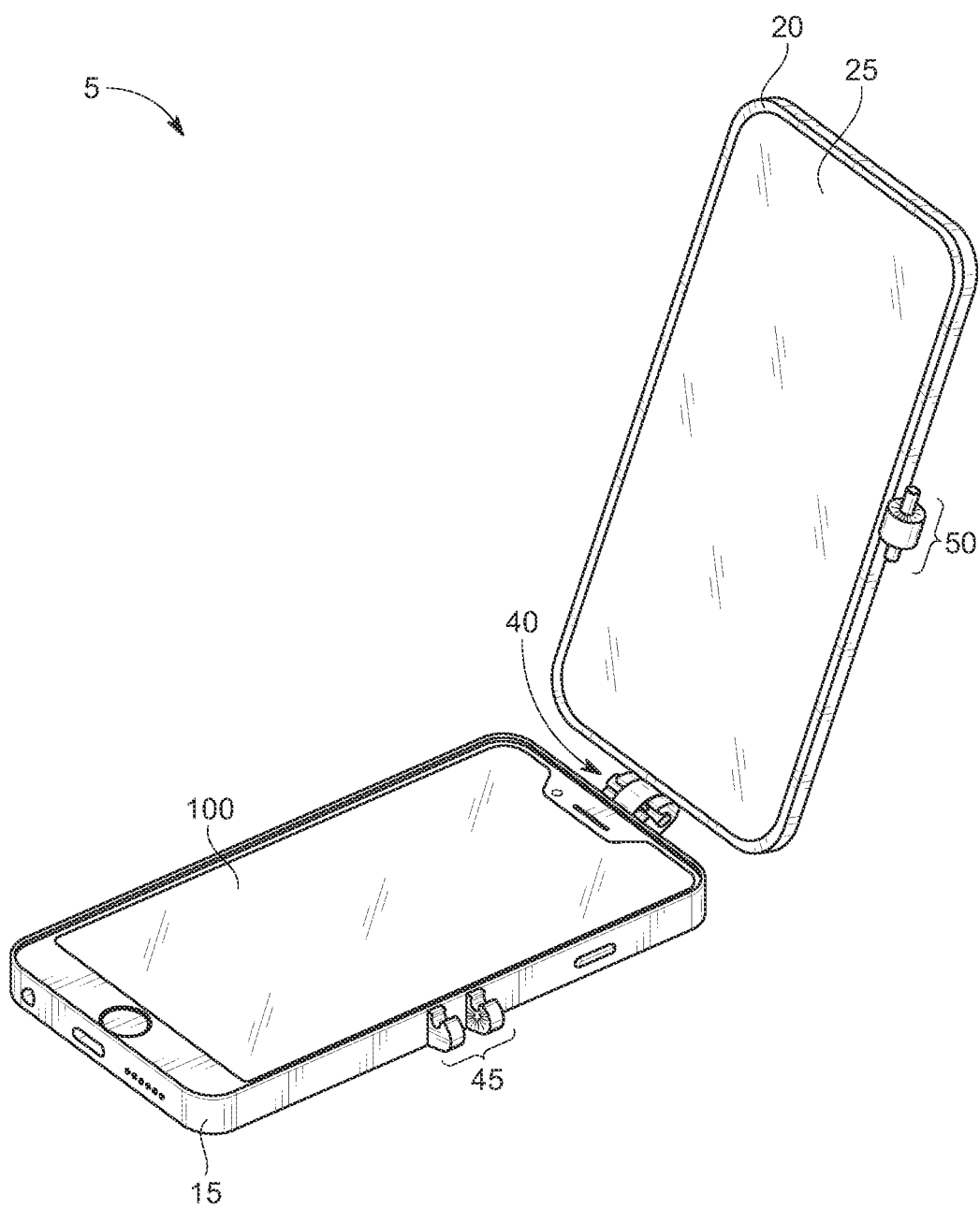
FIG. 10A is a perspective view of a first embodiment adjustable mirror assembly for a handheld image recording device.

To form the hinge assembly 40 illustrated in FIGS. 10A and 12, dowel 51 is received and retained within c-shaped hook 46, with grooved collar 52 being positioned such that its outwardly extending grooves 53 abut inwardly depressed grooves 47 of anchor 45. As the user lifts open cover 20, dowel 51 rotates within its c-shaped hook 46, allowing the user to rotate cover 20 about the x-axis of hinge assembly 40. The user can then position cover 20 at a plurality of angular positions relative to case 15, and grooved collar 52 prevents the cylindrical pin insert 50 from slipping out of position, enabling cover 20 to remain in the angular position cover 20 was placed in by the user.

Figure 8:
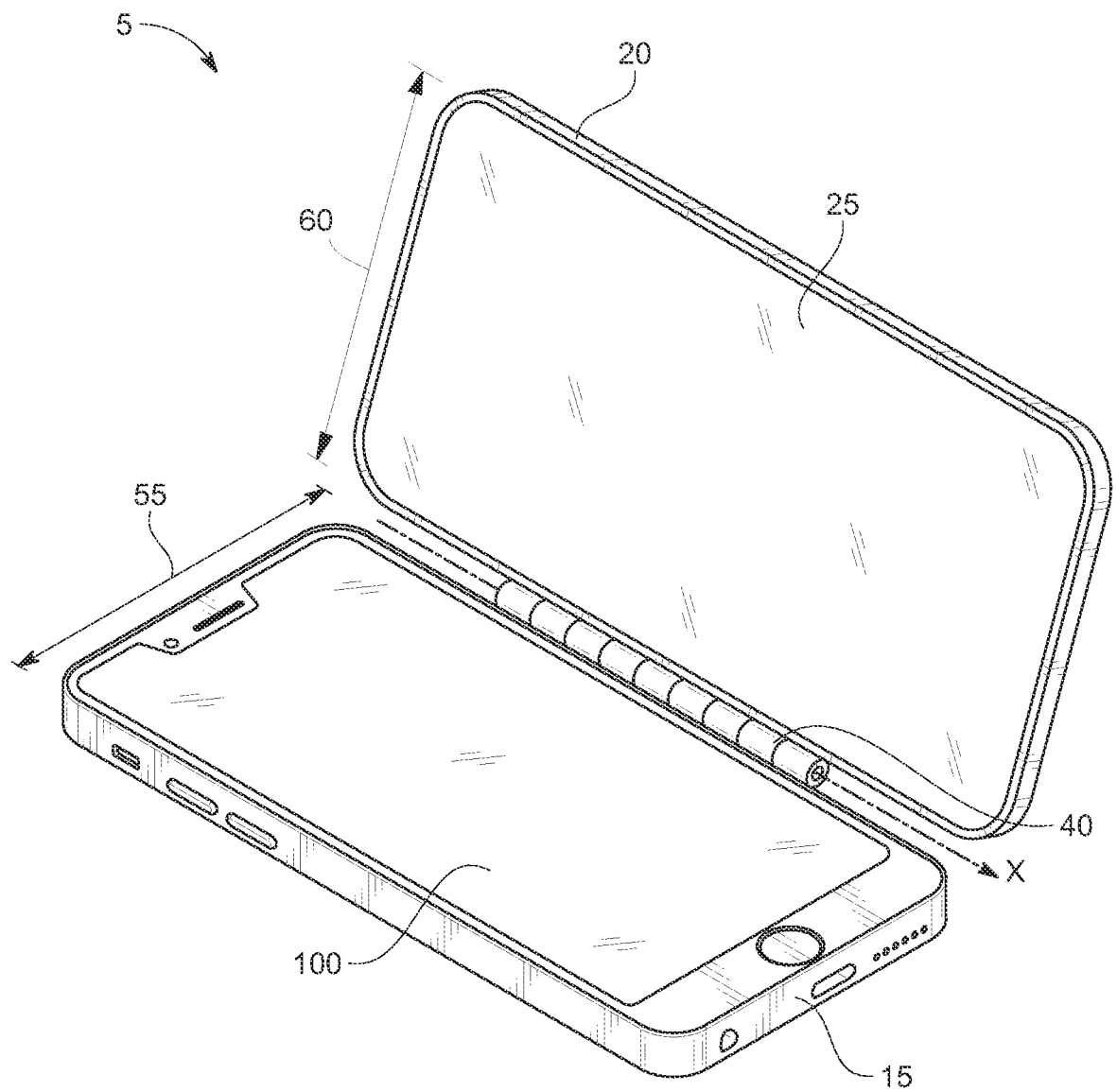
FIG. 8 is a perspective view of a first embodiment adjustable mirror assembly for a handheld image recording device.
Figure 9:
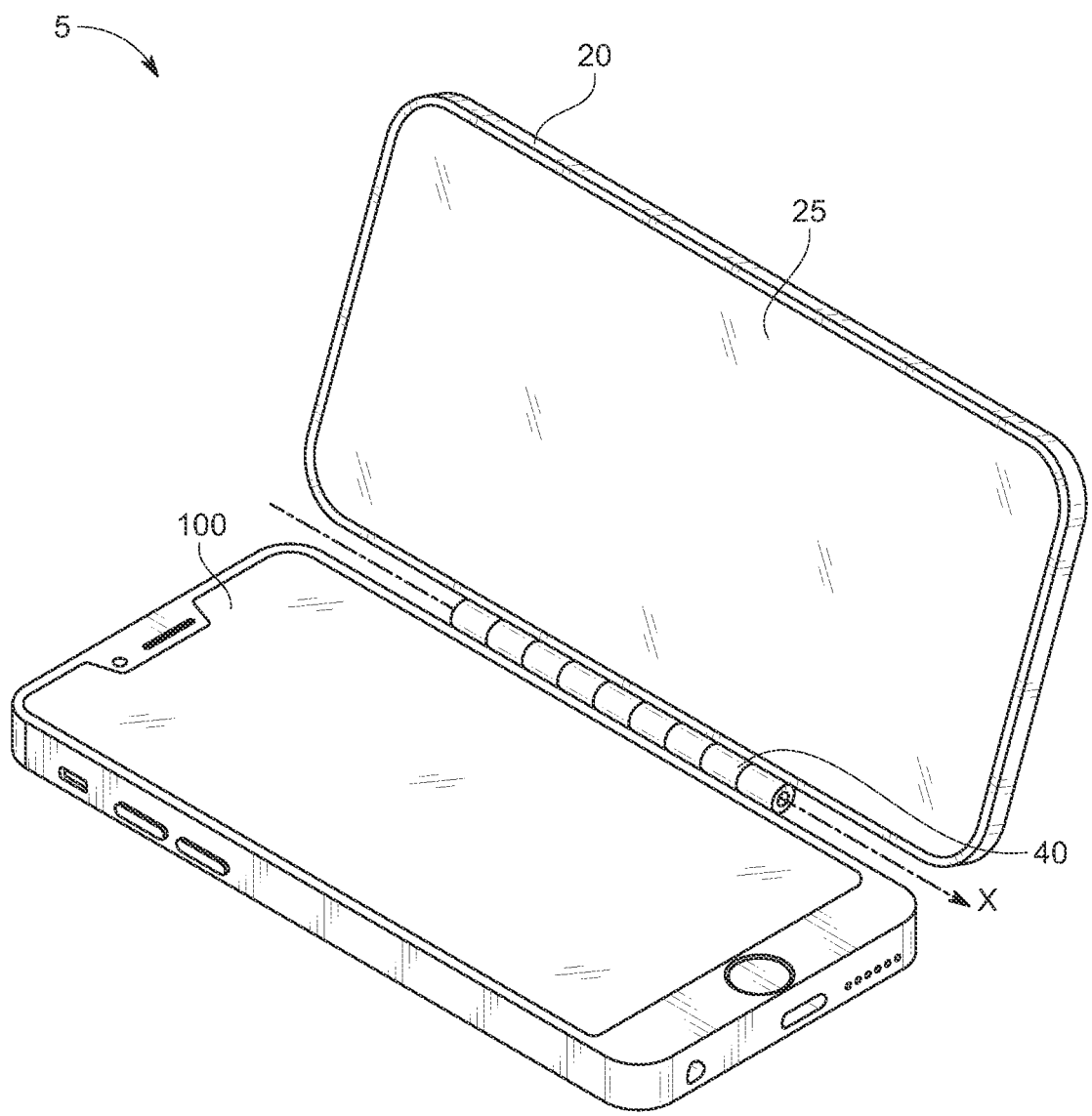
FIG. 9 is a perspective view of a second embodiment adjustable mirror assembly for a handheld image recording device.

Typically, the first hinged portion 41 is disposed along the top short side 55 of case 15, and the second hinged portion 42 is disposed along the bottom short side 60 of cover 20. As shown in FIGS. 2-3, this variation permits a user to rotate cover 20 about the x-axis of hinge assembly 40, allowing for the user to angle mirror 25 to view a reflection of the image displayed on the handheld image recording device 100 display screen when the handheld image recording device 100 is held in a vertical orientation. In another variation, as shown in FIG. 8, the first hinged portion 41 is disposed along a vertical long side 65 of case 15, and the second hinged portion 42 is disposed along a vertical long side 70 of cover 20. This variation permits a user to rotate cover 20 about the x-axis of hinge assembly 40, allowing for the user to angle mirror 25 to view a reflection of the image displayed on the handheld image recording device 100 display screen when the handheld image recording device 100 is held in a horizontal orientation.

In other variations, there may be a plurality of hinge assemblies 40. In the embodiment illustrated in FIG. 10, a first hinged portion 41 is disposed along top short side 55 of case 15, and a third hinged portion 43 is disposed along vertical long side 65 of case 15. A second hinged portion 42 is disposed along bottom short side 60 of cover 20, and a fourth hinged portion 44 is disposed along vertical long side 70 of cover 20. In these variations, hinge assembly 40 typically comprises a separable hinge system. These variations permit a user to rotate cover 20 about either vertical long side 65 or top short side 55 of case 15, allowing for the user to angle mirror 25 to view a reflection of the image displayed on the handheld image recording device 100 display screen when the handheld image recording device 100 is held in either a vertical or horizontal orientation. For example, when the user desires to take a photograph or video recording while holding the handheld image recording device 100 in a vertical orientation, the user couples the second hinged portion 42 of cover 20 to the first hinged portion 41 of case 15. In this configuration, cover 20 is rotated about the x-axis of hinge assembly 40, thereby allowing the user to angle mirror 25 upwardly or downwardly as necessary to view the reflection of the image displayed on the handheld image recording device 100 display screen and adjust the viewing angle of the handheld image recording device 100 camera if necessary while holding the handheld image recording device 100 in a vertical orientation. Similarly, when the user desires to take a photograph or video recording while holding the handheld image recording device 100 in a horizontal orientation, the user couples the third hinged portion 43 of case 15 to the fourth hinged portion 44 of cover 20. In other variations, a first hinged portion 41 and a third hinged portion 43 may be disposed along the respective top short side 55 and vertical long side of case 15, and a second hinged portion 42 may be disposed along either the bottom short side 60 or vertical long side of cover 20. The user would then couple the second hinged portion 42 to the first hinged portion 41 or the third hinged portion 43, depending on whether the user desires to take a photograph or video recording while holding the handheld image recording device 100 in a horizontal position or a vertical position.

Figure 6:
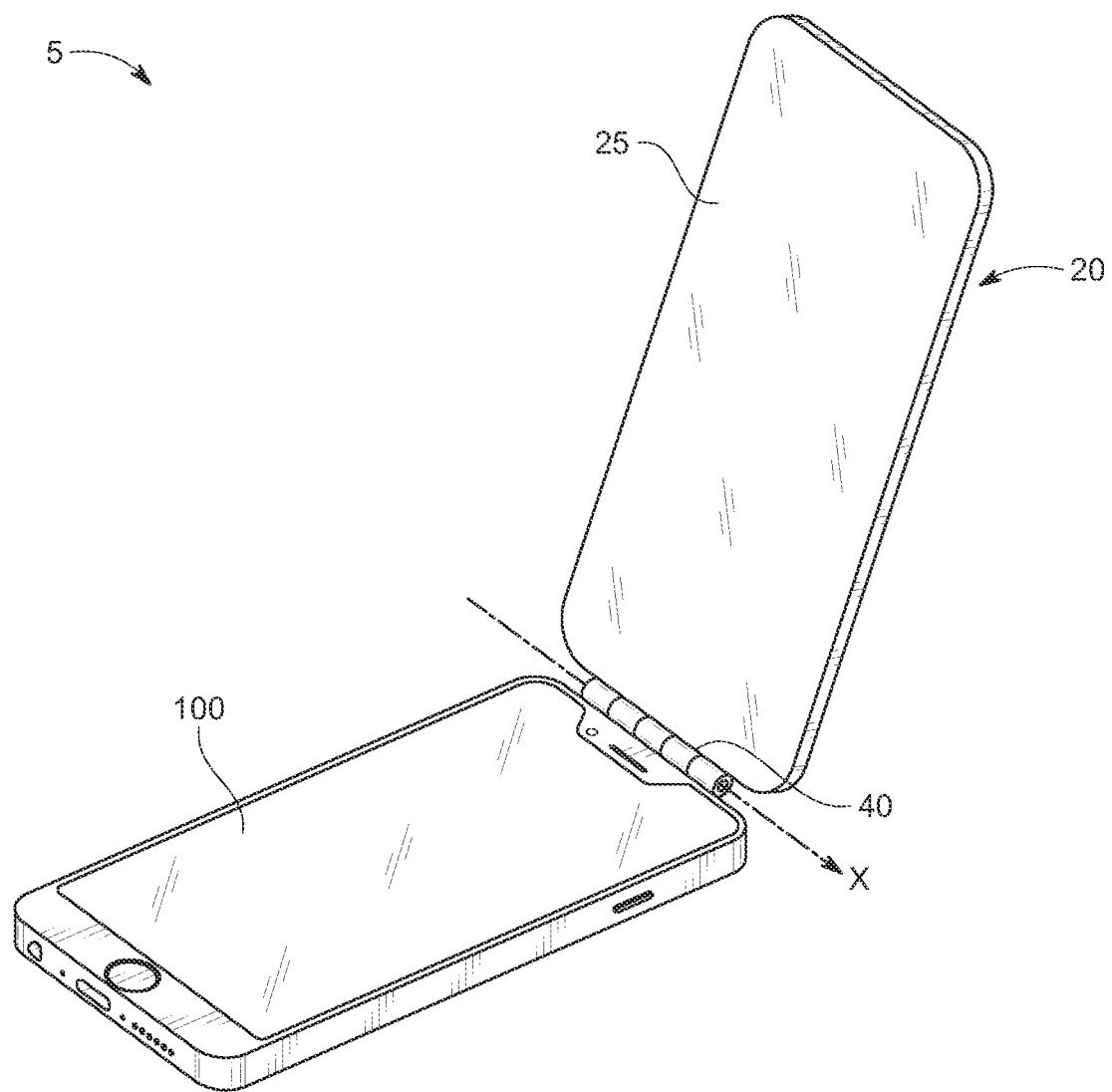
FIG. 6 is a perspective view of a second embodiment adjustable mirror assembly for a handheld image recording device.
Figure 7:
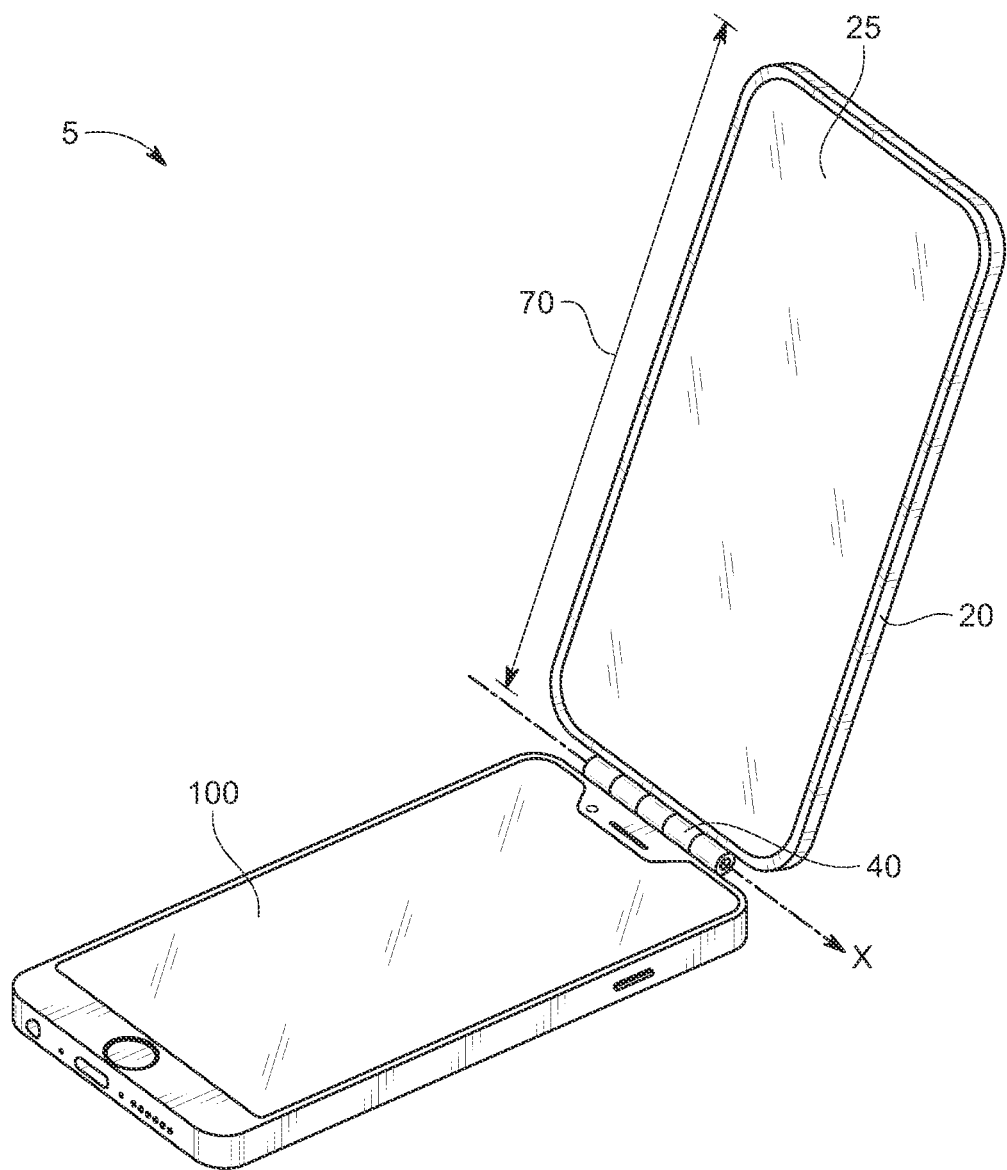
FIG. 7 is a perspective view of a second embodiment adjustable mirror assembly for a handheld image recording device.

A Second Embodiment Adjustable Mirror Assembly for a Handheld Image Recording Device Referring to FIGS. 6-7, a second embodiment adjustable mirror assembly 5 for a handheld image recording device 100 is illustrated. The second embodiment adjustable mirror assembly 5 differs from the first embodiment in that the hinge assembly 40 is coupled directly to or with the handheld image recording device 100 rather than a case 15. Typically, the adjustable mirror assembly 5 for a handheld image recording device 100 comprises a cover 20 having a mirror 25, wherein the cover 20 is movably coupled directly to or with the handheld image recording device 100 at hinge assembly 40.

Referring to FIG. 7, an adjustable mirror assembly 5 is shown. Similar to the first embodiment illustrated in FIGS. 3 and 4, cover 20 includes an outward facing portion 30 and an inward facing portion 35. Cover 20 is typically substantially flat, and is shaped and sized to cover all or substantially all of the planar surface of the front screen side of a handheld image recording device 100 when cover 20 is in the closed stored position. Typically, cover 20 is movably coupled with the handheld image recording device 100 at hinge assembly 40, with cover 20 being configured to move between a closed stored position and a plurality of open deployed positions.

As shown in FIG. 7, a mirror 25 is typically included on the inward facing portion 35 of cover 20. Similar to the first embodiment illustrated in FIG. 4, cover 20 may be structured such that its outer edge forms a cavity, wherein the cavity comprises inward facing portion 35. In this variation, mirror 25 is received and retained within the cavity comprising inward facing portion 35. Typically, mirror 25 is substantially rectangular in shape and sized to have substantially the same dimensions as the handheld image recording device 100 display screen. Mirror 25 typically comprises a flat plate of transparent glass coated with a thin reflective metal layer. In some variations, mirror 25 may comprise a polycarbonate mirror. In other variations, mirror 25 may further include a treated, hardened scratch resistant coating.

In another variation illustrated in FIG. 6, cover 20 comprises a two-way mirror or smart mirror, wherein the outward facing portion 30 is transparent, and the inward facing portion 35 includes a reflective coating comprising mirror 25. In these variations, the user remains able to view the handheld image recording device 100 display screen through the transparent outward facing portion 30 of cover 20 when in the closed stored position.

As illustrated in FIGS. 6-7, cover 20 is movably coupled with the handheld image recording device 100 at hinge assembly 40. Hinge assembly 40 typically comprises a friction hinge system, and enables the cover 20 to be supported at any angular position relative to the handheld image recording device 100's screen. The friction hinge system typically includes a first hinged portion 41 and a second hinged portion 42, each configured for controlled rotation relative to the other. The cover 20 is hinged relative to the handheld image recording device 100 by coupling the first hinged portion 41 integrated with the handheld image recording device 100 to the second hinged portion 42 of case 20. In other variations, the hinge may comprise a swivel hinge or ball-socket hinge. In these variations, cover 20 can be swiveled or tilted about hinge assembly 40 in multiple directions relative to the handheld image recording device's 100 front display screen.

In other variations, hinge assembly 40 may comprise a separable hinge system, such as a take-apart or lift off hinge, similar to the first embodiment illustrated in FIG. 12. In these variations, cover 20 can be quickly uncoupled from and/or recoupled from the handheld image recording device 100. This allows a user to move cover 20 to a different position, exchange cover 20 with another cover 20, or store cover 20 when not in use.

Typically, the first hinged portion 41 is disposed along the top short side 55 of the handheld image recording device 100, and the second hinged portion 42 is disposed along the bottom short side 60 of cover 20. This variation permits a user to rotate cover 20 about the x-axis of hinge assembly 40, allowing for the user to angle mirror 25 to view a reflection of the image displayed on the handheld image recording device 100 display screen when the handheld image recording device 100 is held in a vertical orientation. In another variation, the first hinged portion 41 is disposed along a vertical long side 65 of the handheld image recording device 100, and the second hinged portion 42 is disposed along a vertical long side 70 of cover 20. This variation permits a user to rotate cover 20 about the x-axis of hinge assembly 40, allowing for the user to angle mirror 25 to view a reflection of the image displayed on the handheld image recording device 100 display screen when the handheld image recording device 100 is held in a horizontal orientation.

In other variations, there may be a plurality of hinge assemblies 40. Similar to the first embodiment illustrated in FIG. 10, a first hinged portion 41 is disposed along top short side 55 of the handheld image recording device 100, and a third hinged portion 43 is disposed along vertical long side 65 of the handheld image recording device 100. A second hinged portion 42 is disposed along bottom short side 60 of cover 20, and a fourth hinged portion 44 is disposed along vertical long side 70 of cover 20. In these variations, hinge assembly 40 typically comprises a separable hinge system. These variations permit a user to rotate cover 20 about either vertical long side 65 or top short side 55 of the handheld image recording device 100, allowing for the user to angle mirror 25 to view a reflection of the image displayed on the handheld image recording device 100 display screen when the handheld image recording device 100 is held in either a vertical or horizontal orientation. For example, when the user desires to take a photograph or video recording while holding the handheld image recording device 100 in a vertical orientation, the user couples the second hinged portion 42 of cover 20 to the first hinged portion 41 of the handheld image recording device 100. In this configuration, cover 20 is rotated about the x-axis of hinge assembly 40, thereby allowing the user to angle mirror 25 upwardly or downwardly as necessary to view the reflection of the image displayed on the handheld image recording device 100 display screen and adjust the viewing angle of the handheld image recording device 100 camera if necessary while holding the handheld image recording device 100 in a vertical orientation. Similarly, when the user desires to take a photograph or video recording while holding the handheld image recording device 100 in a horizontal orientation, the user couples the third hinged portion 43 of the handheld image recording device 100 to the fourth hinged portion 44 of cover 20. In other variations, a first hinged portion 41 and a third hinged portion 43 may be disposed along the respective top short side 55 and vertical long side of the handheld image recording device 100, and a second hinged portion 42 may be disposed along either the bottom short side 60 or vertical long side of cover 20. The user would then couple the second hinged portion 42 to the first hinged portion 41 or the third hinged portion 43, depending on whether the user desires to take a photograph or video recording while holding the handheld image recording device 100 in a horizontal position or a vertical position.

Figure 11:
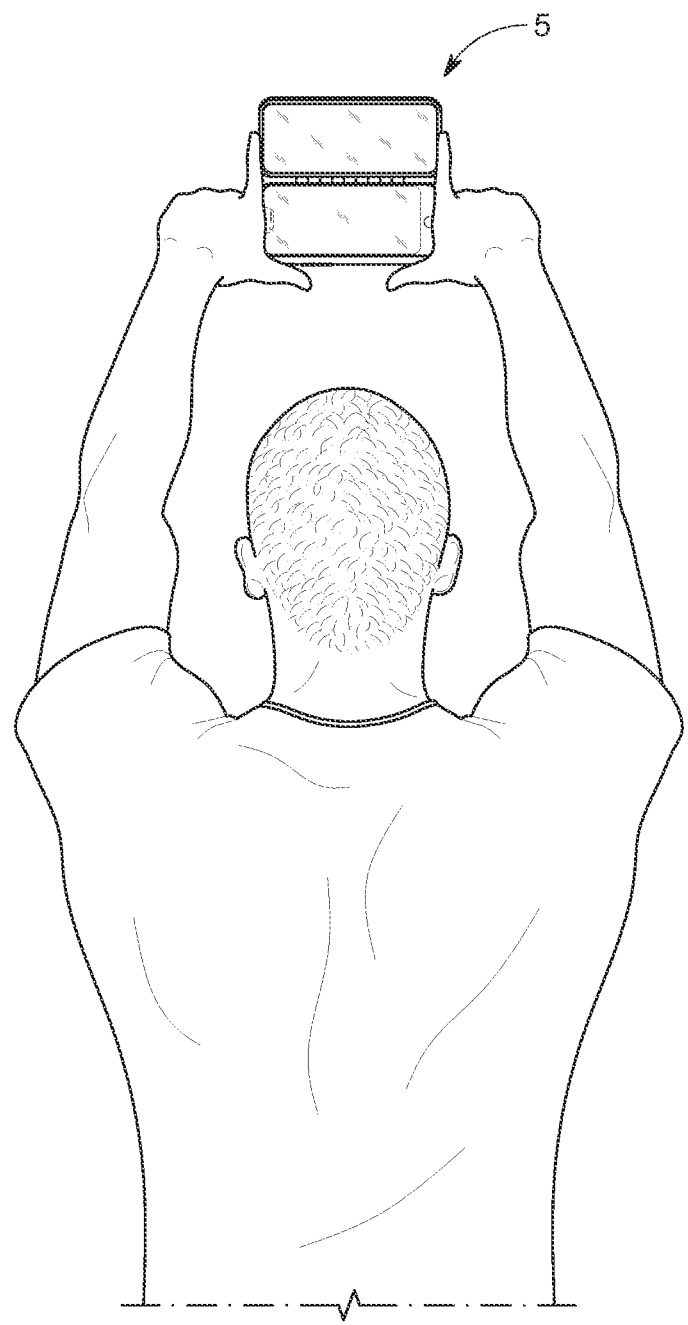
FIG. 11 illustrates a method of using a first embodiment adjustable mirror assembly for a handheld image recording device.

Method of Using Adjustable Mirror Assembly for a Handheld Image Recording Device To use the adjustable mirror assembly 5 for a handheld image recording device 100, the user moves cover 20 from a stored closed position to an open deployed position, and rotates cover 20 about hinge assembly 40 until mirror 25 reaches the desired angular position relative to the handheld image recording device 100 display screen. For example, when the user desires to use the adjustable mirror assembly 5 to ensure the desired image is captured or recorded by the handheld image recording device 100 camera when the handheld image recording device 100 display screen is not visible to the user, such as when the user is holding the handheld image recording device 100 overhead as illustrated in FIG. 11, the user can rotate cover 20 about hinge assembly 40 until mirror 25 reaches the angular position at which mirror 25 reflects the image displayed on the handheld image recording device's 100 display screen to the user, allowing the user to view the image being captured by the handheld image recording device 100 camera and adjust the handheld image recording device 100 camera's field of view if necessary. As another example, the user can rotate cover 20 about hinge assembly 40 until outward facing portion 30 rests against the back side of the handheld image recording device 100, and use mirror 25 as an accessory mirror when the user does not otherwise have readily available access to a mirror.

Alternative Embodiments and Variations

The various embodiments and variations thereof, as illustrated in the accompanying Figures or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A combination of an adjustable mirror assembly and a handheld image recording device having a display screen, the adjustable mirror assembly comprising:
 a case configured to removably hold a handheld image recording device therein, the case having a first hinged portion disposed thereon;
 a cover having a second hinged portion disposed thereon, the cover including an inward facing portion having a mirror, the first hinged portion and the second hinged portion being coupled to form a hinge assembly, the cover being configured to move between a stored closed position and at least one of an open deployed position by way of the hinge assembly; and
 the mirror reflecting the display screen when the cover is in the open deployed position, the mirror and the display screen having approximately the same shape and size.

2. The combination of claim 1 wherein the hinge assembly comprises a friction hinge system.

3. The combination of claim 1 wherein the hinge assembly comprises a separable hinge system.

4. The combination of claim 1 wherein the inward facing portion further includes a cavity for receiving and retaining a mirror therein.

5. The combination of claim 1 wherein the cover comprises a two-way mirror, wherein the cover comprises a transparent outward facing portion, and the inward facing portion includes a reflective coating comprising the mirror.

6. The combination of claim 1 wherein the first hinged portion is disposed along a top short side of the case, and the second hinged portion is disposed along a bottom short side of the cover.

7. The combination of claim 1 wherein the first hinged portion is disposed along the long side of the case, and the second hinged portion is disposed along the long side of the cover.

8. The combination of claim 1 wherein the first hinged portion is disposed along the top short side of the case, the second hinged portion is disposed along the bottom short side of the cover, and further including a third hinged portion disposed along the long side of the case, and a fourth hinged portion disposed along the long side of the cover.

9. The combination of claim 1 wherein the first hinged portion is disposed along a top short side of the handheld image recording device, and the second hinged portion is disposed along a bottom short side of the cover.

10. The combination of claim 1 wherein the first hinged portion is disposed along a vertical long side of the handheld image recording device, and the second hinged portion is disposed along a vertical long side of the cover.

11. The combination of claim 1 wherein the first hinged portion is disposed along the top short side of the handheld image recording device, the second hinged portion is disposed along the bottom short side of the cover, and further including a third hinged portion disposed along the vertical long side of the handheld image recording device, and a fourth hinged portion disposed along the vertical long side of the cover.

12. A combination of an adjustable mirror assembly and a handheld image recording device having a display screen, the handheld image recording device having a first hinged portion disposed thereon, the adjustable mirror assembly comprising:
 a cover having a second hinged portion disposed thereon, the first hinged portion and the second hinged portion being coupled to form a hinge assembly, the cover being configured to move between a stored closed position and at least one of an open deployed position by way of the hinge assembly; and
 the cover including an inward facing portion having a mirror, the mirror reflecting the display screen when the cover is in the open deployed position, the mirror and the display screen having approximately the same shape and size.

13. The combination of claim 12 wherein the hinge assembly comprises a friction hinge system.

14. The combination of claim 12 wherein the hinge assembly comprises a separable hinge system.

15. The combination of claim 12 wherein the inward facing portion further includes a cavity for receiving and retaining a mirror therein.

16. The combination of claim 12 wherein the cover comprises a two-way mirror, wherein the cover comprises a transparent outward facing portion, and the inward facing portion includes a reflective coating comprising the mirror.

17. An adjustable mirror assembly for use with a handheld image recording device comprising:
 a case configured to removably hold a handheld image recording device having a display screen therein, the case having a first hinged portion disposed thereon;
 a cover having a second hinged portion disposed thereon, the first hinged portion and the second hinged portion being coupled to form a hinge assembly;
 the cover having a transparent outward facing portion and an inward facing portion having a reflective coating comprising a mirror;
 the cover being configured to move between a stored closed position and at least one of an open deployed position by way of the hinge assembly, the mirror reflecting the display screen when the cover is in the open deployed position.

18. The adjustable mirror assembly of claim 17 wherein the hinge assembly comprises a friction hinge system.

19. The adjustable mirror assembly of claim 17 wherein the hinge assembly comprises a separable hinge system.

* * * * *